United States Patent [19]

Bertorello

[11] 4,209,180

[45] Jun. 24, 1980

[54] SELF-CENTERING WORK HOLDING AND POSITIONING FIXTURE FOR MACHINE TOOLS

[75] Inventor: Mario Bertorello, Turin, Italy

[73] Assignee: Rotomors S.p.A., Orbassano, Italy

[21] Appl. No.: 952,879

[22] Filed: Oct. 18, 1978

[30] Foreign Application Priority Data

Nov. 15, 1977 [IT] Italy .............................. 69575 A/77

[51] Int. Cl.[2] .............................................. B23B 31/30

[52] U.S. Cl. .......................................... 279/4; 279/17

[58] Field of Search ................. 279/4, 5, 9 R, 66, 119, 279/16, 17

[56] References Cited

U.S. PATENT DOCUMENTS

| | | | |
|---|---|---|---|
| 3,790,181 | 2/1974 | Scharfen | 279/4 |
| 3,938,816 | 2/1976 | Manchester | 279/4 X |
| 4,009,888 | 3/1977 | Wallace | 279/4 X |

*Primary Examiner*—Gil Weidenfeld

*Attorney, Agent, or Firm*—Sughrue, Rothwell, Mion, Zinn & Macpeak

[57] ABSTRACT

A self centering workpiece-positioning fixture for a machine tool, especially for a lathe, has aligned opposed jaws one of which is reciprocable toward and away from the other along their common axis and bath are rotatable on such axis. A clutch having a member axially displaceable but not rotatable with respect to the not-reciprocable jaw being provided for locking the said not-reciprocable jaw to the fixture body.

11 Claims, 5 Drawing Figures

54
1
3
2
7
4
9
8
4
5
6
3

13
11
6
9
12
17
15
10
14
16
18
20
19
21
22

1
32
31
30
42
46
44
47
45
54
53
7
33
29
38
24
36
35
34
26
40
9
43
27
28
35
36
50
39
41
37
55
23
32
25
30
51
52
48
61
49
59
64
69
67
63
56
58
57
65
66
60
62
68
70

SELF-CENTERING WORK HOLDING AND POSITIONING FIXTURE FOR MACHINE TOOLS

BACKGROUND OF THE INVENTION

The present invention relates to self-centering workpiece holding and positioning fixtures for machine tools such as lathes.

The invention has particular reference to workpiece holding and positioning fixtures of the kind comprising a body attachable to a rotary spindle of a machine tool and having a pair of jaws rotatable about a common axis which intersects the axis of rotation of the said body, a first servo control for moving one of the said jaws along the said common axis, a second servo control controlling a clutch for connecting the other jaw to the body of the fixture, and a third servo control for rotating the said other jaw about said common axis via a transmission including a sprocket which is coaxial with said other jaw.

In one self-centering fixture of this kind, herein referred to as "a self-centering fixture of the kind specified", which is disclosed by the U.S. Pat. No. 3,790,181 the clutch consists of a ring gear formed on the surface of the said other jaw and cooperating with a conjugate ring gear formed upon the body of the chuck.

The second servo control which controls this clutch comprises a piston fixed to a shaft constituting an extension of the said other jaw and slidable within a cylinder in the body of the fixture to form a double-acting hydraulic actuator. When it is necessary to cause rotation of the two jaws and of the workpiece gripped between them through a predetermined angle, for example 90°, the said hydraulic actuator is operated to move the said other jaw axially by an amount sufficient to effect disengagement of the two ring gears which constitute the clutch. Disengagement having been effected, the third servo control then comes into operation: this servo control may comprise a rotary hydraulic motor which acts upon the said other jaw by way of a transmission which includes a worm wheel keyed on to the said shaft of the said jaw, and engaged by a worm screw driven by the said hydraulic motor. After rotation of the said other jaw, and with it the workpiece and the first jaw, the actuator which controls the clutch comes into action again to effect axial movement in the opposite direction of the said other jaw, re-engaging the clutch by bringing the ring gears formed respectively on the said other jaw and on the body into engagement with each other.

A disadvantage of the aforesaid known system is that it is necessary to displace the workpiece, which may weigh several hundredweight, laterally in relation to the axis of rotation of the fixture in order to effect engagement and disengagement of the clutch. It is consequently necessary to stop the operation of the machine tool on which the fixture is mounted for the period of time necessary for causing rotation of the jaws around the common axis of the jaws, while ensuring that the jaws continue to grip the workpiece, in order to present for machining a surface of the workpiece which is angularly displaced from the surface previously machined. Another disadvantage lies in the need to keep the workpiece gripped between the jaws during the said lateral displacements of the jaws relative to the axis of rotation of the body of the fixture.

OBJECT OF THE INVENTION

An object of the present invention is to provide a self-centering fixture of the kind specified, which is essentially free of the above cited disadvantages. More particularly, it is an object of the invention to provide a self-centering fixture which is especially suitable for holding and positioning heavy workpieces on machine tools, in correspondence with planes the intersecting axes of which are angularly displaced relative to each other, in which the gear connecting the said other jaw to the body of the fixture is such as to effect efficient locking of the workpiece during machining, while avoiding the need to effect movement of this jaw, and with it the workpiece, relative to the axis of rotation of the body of the fixture, before rotation thereof around the common axis of the jaws.

THE INVENTION

According to the present invention there is provided a self-centering fixture of the kind specified which is characterised in that the said other jaw is mounted in the body of the fixture in such a manner that it is always at a constant distance from the axis of rotation of the said body, the said clutch includes an intermediate member mounted upon and the said other jaw for rotation therewith, at least part of the said intermediate member being movable relative to the said other jaw in order to engage the clutch for effecting different rotational displacements of the said other jaw about the common axis.

ADVANTAGES OF THE INVENTION

In the fixture according to the invention the clutch can be engaged and disengaged without axial displacement of the jaws, thereby avoiding the disadvantages referred to above.

BRIEF DESCRIPTION OF THE DRAWINGS

The invention will be further described, by way of non-restrictive example, with reference to the accompanying drawings, in which.

DETAILED DESCRIPTION OF ONE EMBODIMENT OF THE INVENTION

Figure 1:
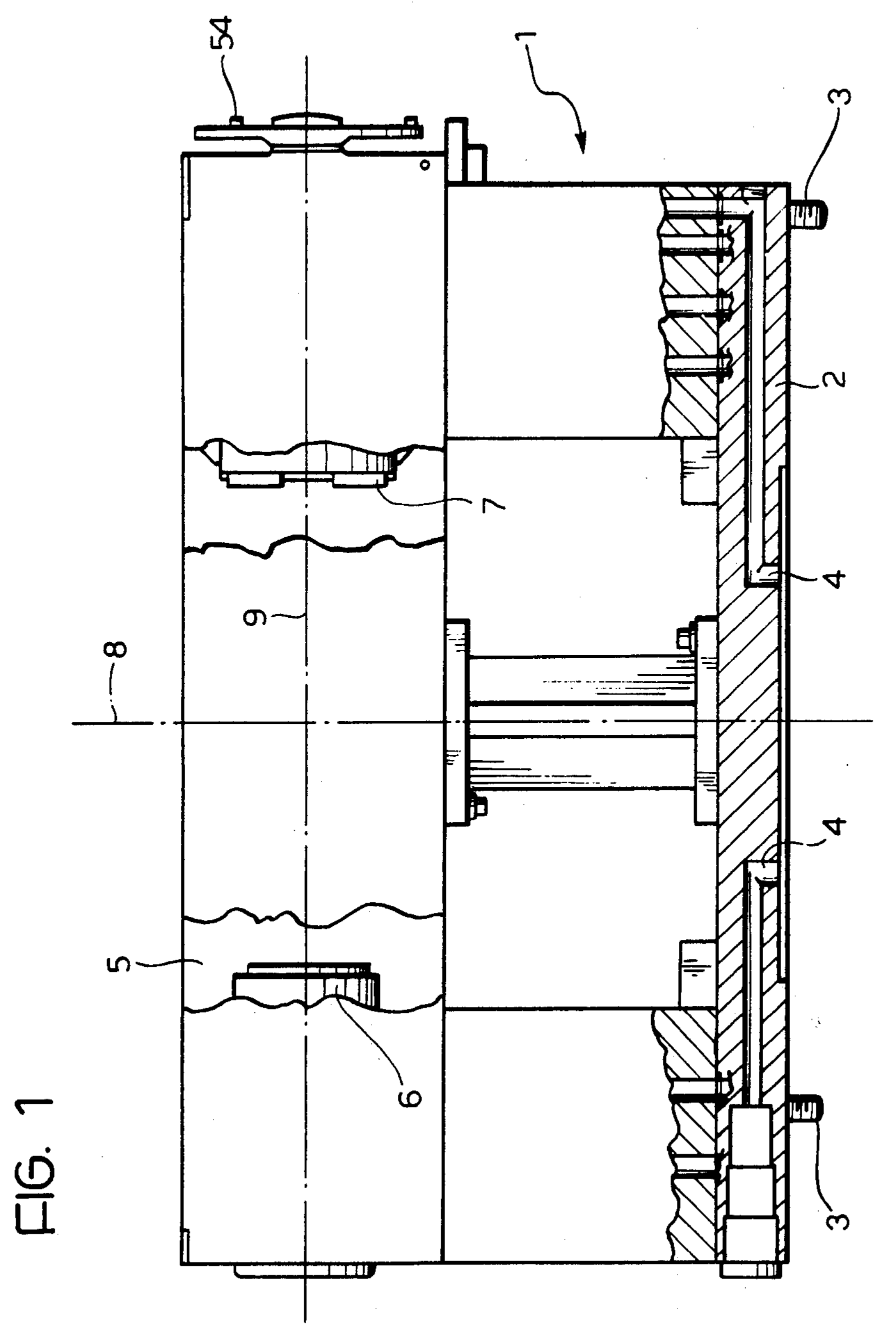
FIG. 1 is a lateral elevational view, partially sectioned, of a self-centering fixture according to one embodiment of the present invention.
Figure 2:
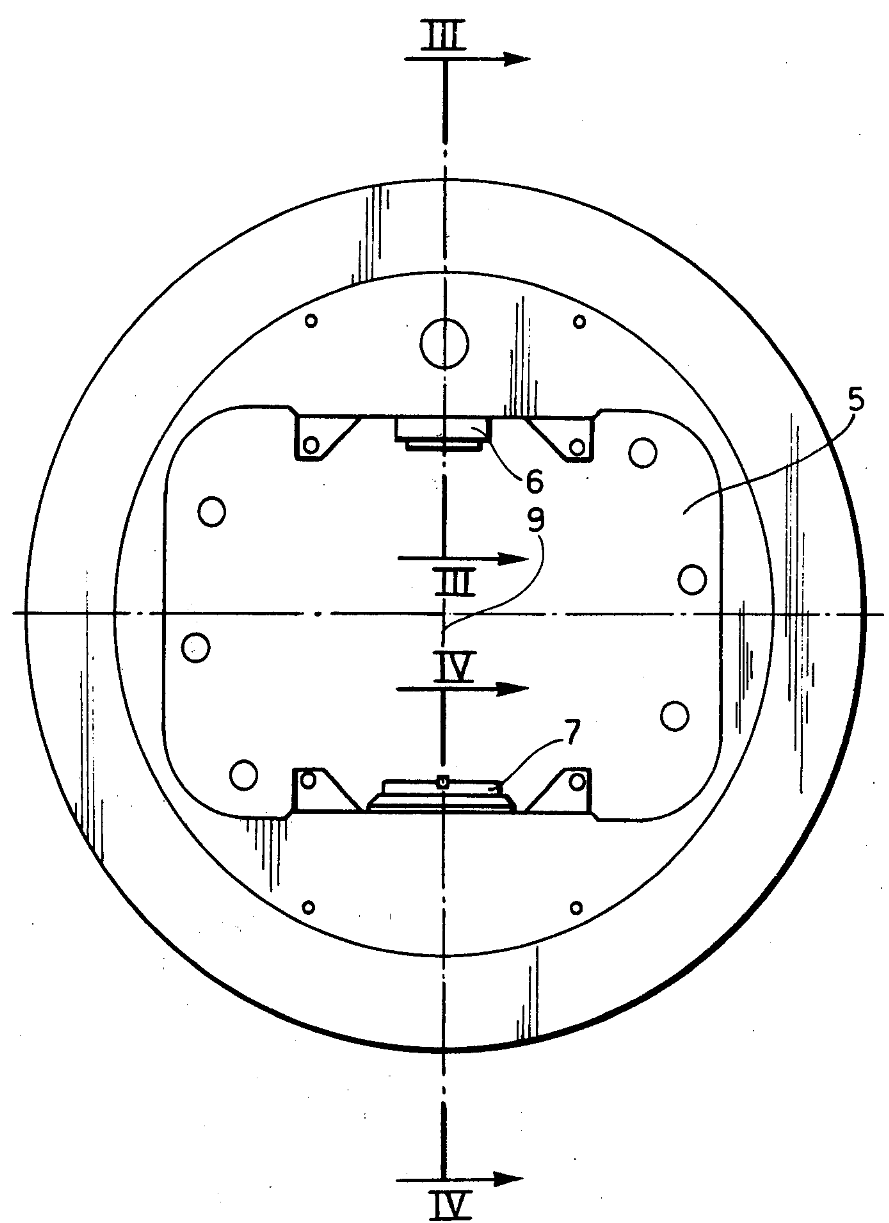
FIG. 2 is a front elevational view of the fixture.

The fixture illustrated in the drawings comprises a body 1 formed with a rear platform 2 having fixing means in the form of threaded studs 3 for fixing the platform to a rotary spindle of a machine tool. The platform 2 also has internal ducts 4 for feeding a working fluid (oil) under pressure for operating the movable parts of the fixture as described hereinafter.

Opposite the platform 2 the body 1 is formed with a cavity 5 for receiving a workpiece to be machined. Two opposed jaws 6 and 7 project into the cavity 5 on opposite sides of the axis of rotation 8 of the body 1 of the fixture. The jaws 6 and 7 are coaxial with each other and are mounted in the body 1 so that they can rotate around their common axis 9.

Figure 3:
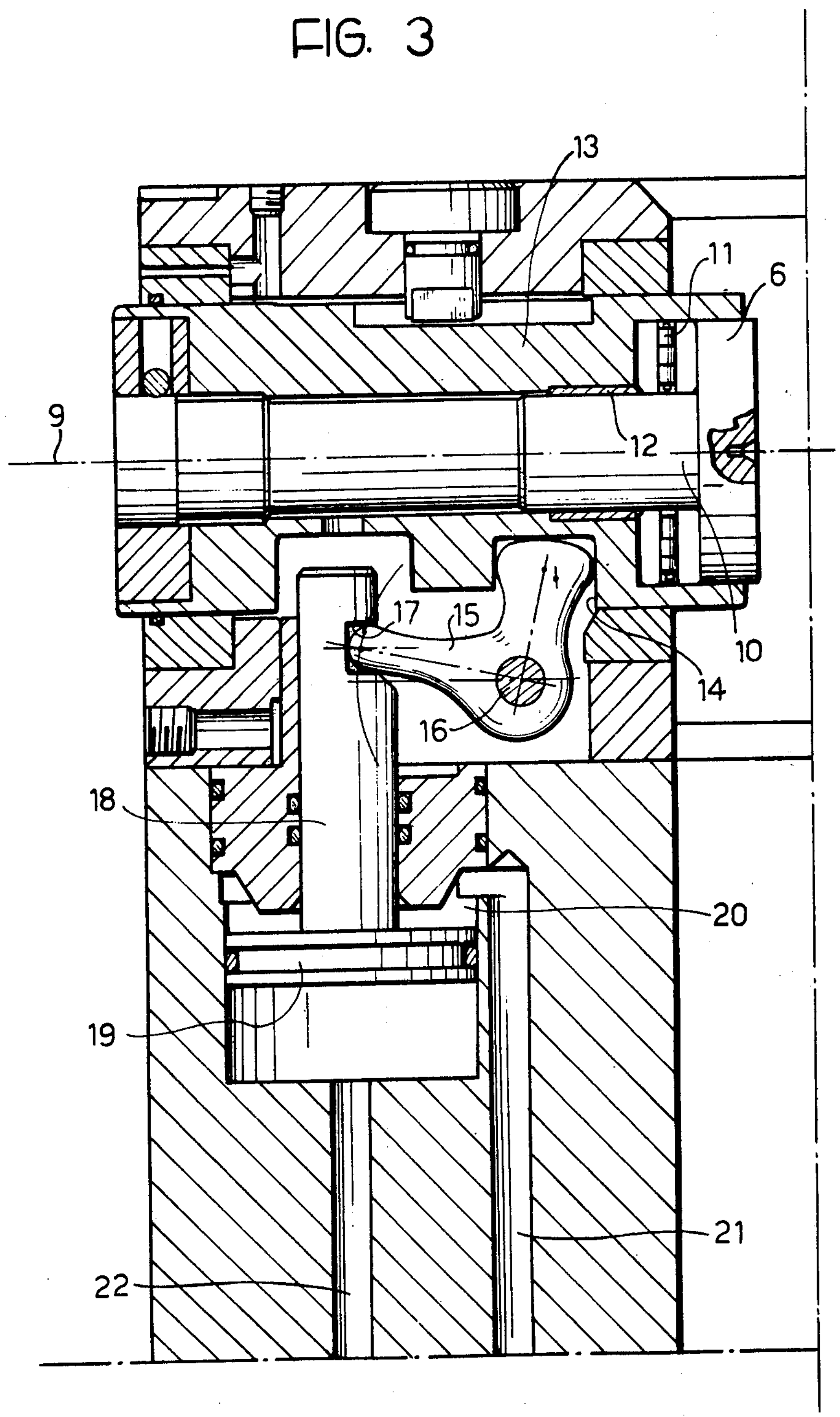
FIGS. 3 and 4 are sections, on an enlarged scale, taken along lines III—III and IV—IV in FIG. 2.

Referring to FIG. 3, the jaw 6 has a shank 10 projecting away from the jaw 7, the shank 10 being mounted rotatably, with the interposition of a thrust bearing 11 and a plain bearing 12, in a bush 13 which is slidable in the body 1 in the direction of the axis 9. The bush 13 has a notch 14 in which there engages one of the arms of a bellcrank lever 15 rotatable about an axis 16 perpendicular to the plane containing the axes 8 and 9. The other arm of the bellcrank lever 15 engages in a notch 17 in a rod 18 attached to a piston 19. The piston 19 is slidable in a direction parallel to the axis 8 in a cylinder 20 in the body 1. The opposite ends of the cylinder 20 communicate with ducts 21 and 22 respectively, each of which can be connected selectively to a source of fluid under pressure or to exhaust. When the duct 21 is connected to the exhaust and the duct 22 to the fluid pressure source the piston 19 is thrust towards the shank 10 and transmits a force, via the rod 18, the bellcrank lever 15 and the bush 13, to the jaw 6 urging this latter into engagement with a workpiece (not shown) located in the cavity 5, and gripping the workpiece against the jaw 7, with the interposition of intermediate adaptor elements (not illustrated) the shape and size of which depend upon the dimensions and shape of the workpiece.

Figure 4:
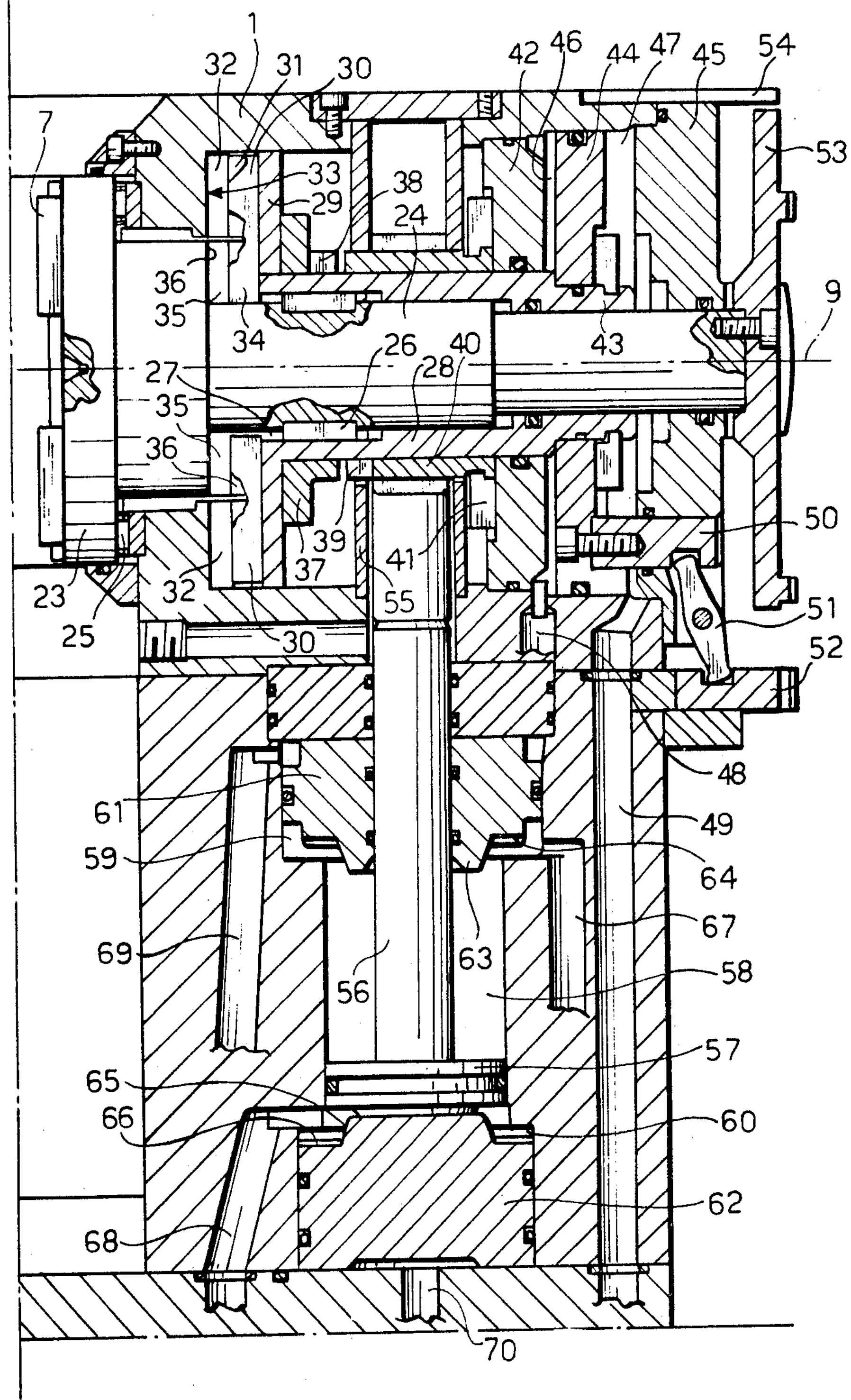

Referring to FIG. 4 the jaw 7 has a head 23 and a shank 24 projecting away from the jaw 6. The shank 24 is rotatable in a part of the body 1 which is made up of a plurality of components to facilitate assembly.

A thrust bearing 25 discharges on to the body 1 the workpiece-gripping force exerted on the head 23 by the jaw 6 and ensures that, even when the workpiece is gripped, the jaw 7 is able to rotate around the axis 9. The shank 24 of the jaw 7 is slidable axially in a sleeve 28, rotation of the shank 24 relative to the sleeve being prevented by keys 26 engaged in slots 27 in the sleeve 28. The sleeve 28 has a radial flange 29 at its end adjacent the head 23. The face of the radial flange 29 facing the head 23 has radial teeth which form an annular ring gear 30.

The teeth of the ring gear 30 engage with teeth 31 projecting from a replaceable first ring gear 32 fixed to a radial shoulder 33 of the body 1 facing the flange 29. The teeth of the ring gear 30 also mesh with radial teeth 34 of a second ring gear 35, also replaceable, fixed to a radial shoulder 36 on the head 23 of the jaw 7, coplanar with the shoulder 33 of the body 1. The radial flange 29 of the sleeve 28 has, on its face remote from the ring gear 30, a reinforcing disc 37 provided with gear teeth 38 on the side of the disc 37 opposite the flange 29. The gear teeth 38 cooperate with gear teeth 39 formed on an adjacent end of a tubular sprocket 40 mounted rotatably on the sleeve 28 and secured against movement in the direction of the axis 9 by a locking ring 41.

The locking ring 41 has an annular ridge which engages in an annular circumferential groove on the sprocket 40 in correspondence with the end of the said sprocket opposite that which bears the gear teeth 39. The locking ring 41 is fixed to an annular wall 42 having a central aperture with a seal through which passes a terminal part 43 of the sleeve 28 opposite the jaw 7.

The terminal part 43 of the sleeve 28 carries a piston 44 which slides in a cylinder delimited axially by the annular wall 42 and by a fixed wall 45, the latter having a central hole through which a reduced diameter end portion of the shank 24 passes. The piston 44 subdivides the said cylinder into two chambers 46 and 47 which communicate with respective ducts 48 and 49 in the body 1 leading to distributors (not shown) for connecting the chambers 46 and 47 selectively with a source of oil under pressure or with the exhaust. The distance between the walls 42 and 45 of the cylinder and the thickness of the head of the piston 44 are such that the sleeve 28 can move between a first end position in which the ring gear 30 is fully engaged with the teeth 31 and 34 respectively of the first and second ring gears 32 and 35 fixed respectively to the body 1 and to the head 23 of the jaw 7, and in which the gear teeth 38 are at the same time disengaged from the gear teeth 39 of the sprocket 40, and a second end position in which the teeth of the said ring gear 30 are disengaged from the teeth 31 and 34 respectively of the ring gears 32 and 35 and in which the gear teeth 38 are fully engaged with the gear teeth 39 of the sprocket 40. The component parts are moreover so placed and dimensioned that the sleeve 28 is never disengaged from the ring gears 32 and 35 or from the gear teeth 39.

A pin 50 fixed to the piston 44 acts, via a lever 51, upon an indicator element 52 the position of which indicates the position of the sleeve 28 within the body 1 of the fixture. A disc 53 fixed to the end of the shank 24 of the jaw 7 cooperates with reference members 54 (see FIGS. 1 and 4) which are radially adjustable and which are associated operatively with proximity switches (not shown) which serve to indicate the angular position of the jaw 7.

The sprocket 40 meshes with a toothed rack 55 fixed to the rod 56 of the main piston 57 of a double acting actuator. The piston 57 slides with a fluid-tight seal within a central chamber 58 of a cylinder, which also has end chambers 59 and 60 communicating with the central chamber 58 but of greater diameter than the latter.

Within the end chambers 59 and 60 respective auxiliary pistons 61 and 62 slide with fluid-tight seals. The auxiliary piston 61 is slidable upon the piston rod 56 and it has, on its side which faces towards the central chamber 58, an annular projection 63 which extends from an annular shoulder 64 the outer diameter of which is greater than the diameter of the central chamber 58. The ausiliary piston 62 has, on its side which faces towards the central chamber 58, a projecting frusto-conical portion 65 which extends from an annular shoulder 66 the outer diameter of which corresponds substantially to the diameter of the end chamber 60.

The parts of the central chamber 58 situated on the opposite sides of the piston 57 communicate through respective parts with ducts 67 and 68 respectively which include distributors (not shown) for connecting the ducts selectively to a source of fluid under pressure or to exhaust. The positions of the shoulders 64, 66 are such that the auxiliary pistons 61 and 62 are clear of the respective parts communicating with the central chamber 58 when the auxiliary pistons abut end walls of the respective chambers 59, 60 remote from the central chamber 58, as shown in FIG. 4. The end chambers 59 and 60 are respectively in communication with ducts 69 and 70 respectively, which also include distributors (not shown) analagous to those in the ducts 67 and 68.

Reciprocation of the piston 57, and with it the rod 56 and the rack 55, takes place between stops which limit the piston stroke to the distance between the main piston 57 and the auxiliary piston 61 in the position shown in FIG. 4. These strokes produce corresponding rotations of the jaw 7, and of the workpiece and of the gripping jaw 6, through 90°.

When it is desired to reduce the stroke of the piston 57 by a predetermined amount, for the purpose of effecting rotations of the workpiece less than 90°, then fluid under pressure is injected into that part of a selected one, or both, of the end chambers 59 or 60 situated on the side of the respective auxiliary piston 61 or 62 remote from the main piston 57, causing controlled displacement of a selected one of the auxiliary pistons 61 or 62, or of both auxiliary pistons, towards the central chamber 58. This results in a reduction in the stroke of the main piston 57 and therefore, of the angular movement of the workpiece.

Movement of the main piston 57 is effected by feeding into the central chamber 58, to one side or the other of the main piston 57, fluid under pressure, through a selected one of the ducts 67 or 68, the other duct being connected to the exhaust.

MODIFICATIONS OF THE EMBODIMENT DESCRIBED

It will be appreciated that without changing the principle of the invention details of practical embodiments may also be widely varied, within the scope of the present invention.

Thus one of the end chambers 59 and 60 and its respective auxiliary piston 61 and 62, or both such chambers and auxiliary pistons, could be omitted in order to simplify the construction, while dispensing with the advantages arising from the ability to shorten the stroke of the piston 57 and therefore of the rack 55.

Also the ring gear 35 fixed to the head of the jaw 7 could be omitted, and the sprocket 40 keyed directly onto the shank 24 of the jaw 7.

Figure 5:
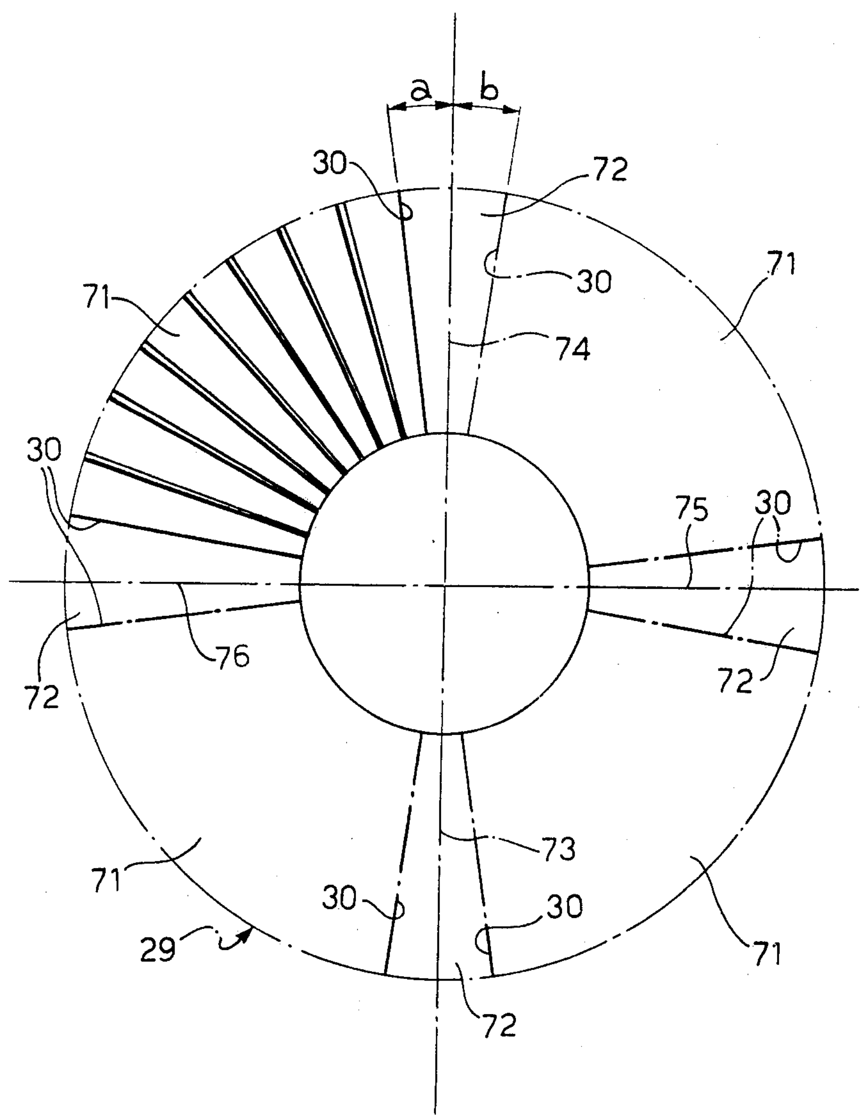
FIG. 5 is a diagrammatic front elevational view of a variant of the fixture illustrated in FIGS. 1 to 4.

A practically advantageous variant of the invention is illustrated in FIG. 5 in which the teeth of the ring gear 30 borne by the radial flange 29 of the sleeve 28 and the teeth 31 of the ring gear 32 fixed to the body 1 are each arranged in four toothed sectors 71 of equal angular extent, each subtendingg an angle which is a submultiple of 90°, separated from each other by plain sectors 72 having no teeth. The plain sectors 72 are arranged symmetrically with respect to pairs of axes 73, 74 and 75, 76 respectively, aligned in two mutually perpendicular pairs.. The widths of the plain sectors 72 are equal to each other and equal to the pitch of at least two teeth of the toothed sectors 71.

This construction serves to cause the workpiece to rotate through angles which are not submultiples of 90° (for example 4°37').

Finally, the means which prevents the jaw 7 from rotating relative to the body 1 under the action of the rack 55 could alternatively comprise a member or element fixed to the shank 24 of the said jaw and bearing at least one piston sliding in a radial cylinder borne in the said member or element, said cylinder communicating, via an axial duct in the said shank, with a distributor which connects the said cylinder selectively with a source of fluid under pressure or with the exhaust. This would make possible a frictional engagement between the jaw operated by the rack and the body of the fixture, and reliable stopping of a heavy workpiece in a desired angular position, without having to move the workpiece before rotation for the purpose of carrying a surface of the said workpiece different from that previously worked into a working zone.

What I claim is:

1. A self-centering workpiece-positioning fixture for a machine tool, especially for a lathe, of the kind comprising a body attachable to a rotary spindle of a machine tool and haveing a pair of opposed jaws supported for rotation about a common axis which intersects the axis of rotation of the said body, a first servo control means for moving one of the said jaws along the said common axis, a second servo control means controlling a clutch for selectively connecting the other jaw to the body of the fixture, and a third servo control means for rotating the said other jaw about said common axis via a transmission means including a sprocket which is coaxial with and rotatable relative to said other jaw, wherein the said other jaw is mounted in the body of the fixture in such a manner that it is always at a constant distance from the axis of rotation of the said body and the said clutch includes an intermediate member mounted upon the said other jaw for rotation therewith, at least part of the said intermediate member being movable axially relative to the said other jaw to connect said other jaw to said body of the fixture in a first position and to connect said other jaw to said sprocket in a second position for effecting different rotational displacements of the other jaw about the common axis upon rotation of the sprocket.

2. A fixture as claimed in claim 1, in which the said intermediate member comprises a sleeve mounted for axial sliding movement upon a shank of the other said jaw.

3. A fixture as claimed in claim 2, in which the sleeve is provided with gear teeth engageable with conjugate gear teeth formed on the body of the fixture.

4. A fixture as claimed in claim 3, in which the said gear teeth of the sleeve comprise a ring gear with radial teeth formed on an end of the sleeve facing towards a head of the said other jaw, the conjugate teeth comprising a ring gear formed on a part of the body of the fixture which surrounds the head of the said other jaw.

5. A fixture as claimed in claim 4, in which said ring gear on the sleeve is formed, at least in part, on a radial flange at the end of the sleeve adjacent the head of the said other jaw, the said ring gear facing a first ring gear with radial teeth conjugate with those on the sleeve, formed on that part of the body of the fixture which surrounds the head of the said other jaw.

6. A fixture as claimed in claim 5, in which the said ring gear teeth formed on the radial flange of the said sleeve also cooperates with a second ring gear with radial teeth conjugate with said ring gear teeth on the flange and positioned radially inwardly of the said first ring gear, said second ring gear being formed on the head of the said other jaw.

7. A fixture as claimed in claim 3, 4, 5 or 6, in which the sprocket included in the transmission by means of which the said third servo control causes rotation of the said other jaw is mounted rotatably and in a fixed axial position in relation to said other jaw, and the said sleeve has gear teeth conjugate with those on the said sprocket and engageable therewith when the respective first gear teeth on the sleeve are disengaged from the gear teeth on the body of the fixture.

8. A fixture as claimed in claim 7, in which the said sprocket is rotatably mounted on the sleeve.

9. A fixture as claimed in claim 2, in which the said sleeve carries an annular piston slidable in a cylinder in that portion of the body of the fixture which surrounds the shank of the said other jaw and forming, together with the said piston, a double acting hydraulic actuator.

10. A fixture as claimed in claim 7, in which the said sprocket engages a rack connected to a rod of a main piston the axis of which is perpendicular to the common axis of rotation of the two jaws of the fixture, said piston being slidable in a central chamber of a cylinder which forms with said piston a double acting hydraulic actuator, the said cylinder having end chambers communicating with the said central chamber and having diameters greater than the diameter of said central chamber; an auxiliary piston slidable in each of the end chambers, the auxiliary piston which is housed in the end chamber of the cylinder traversed by the rod of the main piston being slidable upon the said rod, and the two auxiliary pistons having projections facing towards the central chamber, the diameter of which is less than that of the said central chamber, each said projection adjoining a radial shoulder the outer diameter of which is greater than the diameter of the said central chamber, and the position of said shoulders on the respective auxiliary pistons being such that the pistons are spaced from respective ports communicating with the central chamber when said auxiliary pistons abut end walls of the respective chambers remote from the central chamber.

11. A fixture as claimed in claim 4 or 5, in which the conjugate ring gears formed respectively on the sleeve and on the body of the fixture each consist of toothed sectors each subtending an angle which is a submultiple of 90°; said toothed sectors being separated by plain sectors, without teeth, of equal width and each substantially equal in width to the pitch of at least two teeth of the toothed sectors, each plain sector being disposed symmetrically with respect to two pairs of aligned axes, the pairs of axes being mutually perpendicular and situated in a plane perpendicular to the common axis of the jaws.

* * * * *